United States Patent
Tomozawa et al.

(10) Patent No.: US 8,894,134 B2
(45) Date of Patent: Nov. 25, 2014

(54) FRONT BODY OF VEHICLE

(75) Inventors: Kosaku Tomozawa, Wako (JP); Yushi Nakao, Wako (JP); Takeshi Yoshimoto, Wako (JP); Manabu Ishizono, Wako (JP)

(73) Assignee: Honda Motor Co., Ltd, Tokyo (JP)

(*) Notice: Subject to any disclaimer, the term of this patent is extended or adjusted under 35 U.S.C. 154(b) by 164 days.

(21) Appl. No.: 13/356,862

(22) Filed: Jan. 24, 2012

(65) Prior Publication Data

US 2012/0212010 A1    Aug. 23, 2012

(30) Foreign Application Priority Data

Jan. 26, 2011    (JP) ................. 2011-014242

(51) Int. Cl.
| | | |
|---|---|---|
| B62D 21/11 | (2006.01) | |
| B62D 21/15 | (2006.01) | |
| B62D 25/08 | (2006.01) | |
| B60K 5/00 | (2006.01) | |

(52) U.S. Cl.
CPC .............. *B62D 21/11* (2013.01); *B62D 21/155* (2013.01); *B62D 25/082* (2013.01); *B60K 5/00* (2013.01)
USPC .. 296/204; 180/291; 296/203.02; 296/187.09

(58) Field of Classification Search
CPC .... B62D 21/11; B62D 21/155; B62D 21/152; B62D 25/082; B62D 25/085; B62D 25/2018
USPC ............. 296/193.03, 193.04, 193.07, 193.09, 296/203.01, 203.02, 204, 187.09; 180/291, 180/312
See application file for complete search history.

(56) References Cited

U.S. PATENT DOCUMENTS

| | | | | |
|---|---|---|---|---|
| 5,251,932 A | * | 10/1993 | Ide | ................................ 280/784 |
| 6,494,472 B2 | * | 12/2002 | Suzuki | .................... 280/124.109 |
| 8,246,061 B2 | * | 8/2012 | Kang | ..................... 280/124.109 |
| 2010/0231005 A1 | * | 9/2010 | Yoshida et al. | .......... 296/203.02 |

FOREIGN PATENT DOCUMENTS

| | | | |
|---|---|---|---|
| JP | 2003-026037 A | | 1/2003 |
| JP | 2003-118632 A | | 4/2003 |
| JP | 2003118632 A | * | 4/2003 |
| JP | 2003-127893 A | | 5/2003 |
| JP | 2004-243785 A | | 9/2004 |
| JP | 2009018725 A | * | 1/2009 |
| JP | 2009-051440 A | | 3/2009 |
| JP | 2010-115946 A | | 5/2010 |

OTHER PUBLICATIONS

Japanese Office Action dated Jan. 22, 2013 (mailing date), issued in corresponding Japanese Patent Application No. 2011-014242 (3 pages).

* cited by examiner

*Primary Examiner* — Jason S Morrow
*Assistant Examiner* — E Turner Hicks
(74) *Attorney, Agent, or Firm* — Westerman, Hattori, Daniels & Adrian, LLP

(57) ABSTRACT

A front body of a vehicle is formed by attaching a subframe to left and right front side frames. The subframe is disposed in front of a floor of a cabin and extends to the left and right. An engine contact part facing toward an engine inside the front body is disposed on an upper part the subframe. The subframe has rear fastening parts fastened to the respective front side frames, and rear arm connecting parts with which respective lower arms are engaged. A portion between each of the rear arm connecting parts and the corresponding rear fastening part is deformed to absorb shocks.

4 Claims, 12 Drawing Sheets

FRONT BODY OF VEHICLE

CROSS REFERENCES TO RELATED APPLICATIONS

The present application claims priority under 35 U.S.C. §119 to Japanese Patent Application No. 2011-014242, filed Jan. 26, 2011, entitled "Front Body of Vehicle". The contents of this application are incorporated herein by reference in their entirety.

FIELD OF THE INVENTION

The present invention relates to a front body of a vehicle in which lower arms that support respective front wheels are connected to left and right ends of a subframe in front of a floor of a cabin, so that shocks (loads) input to the front of the vehicle are absorbed by the subframe.

BACKGROUND OF THE INVENTION

For example, there is a front body of a vehicle in which a subframe is fastened from below to front side members that extend from the front to the rear of the vehicle along respective front wheels. The subframe is substantially rectangular in plan view. The subframe has a rear cross-member positioned near a cabin and extending to the left and right. The rear cross-member protrudes in a V shape toward the front of the vehicle. Therefore, if a load on a drive unit retracted by a collision load from the front is input to the protruding end (receiving portion) of the rear cross-member, the input load can be distributed in the vehicle width direction and to the rear of the vehicle through inclined portions extending from the receiving portion to the left and right. It is thus possible to transmit the load unable to be absorbed by the front body to a rear body of the vehicle and reduce impacts on the cabin (see, e.g., Japanese Patent No. 3622715).

In the related art (Japanese Patent No. 3622715) described above, the subframe has the receiving portion which is a protruding end formed by inclining the rear cross-member toward the front. With this structure, the load unable to be absorbed by the front body can be distributed in the vehicle width direction and to the rear of the vehicle. However, this structure is complex and hence reduces the degree of design freedom. That is, the vehicle body requires a special structure which has a V-shaped rear cross-member and a body frame for accommodating this rear cross-member.

SUMMARY OF THE INVENTION

A front body of a vehicle is provided, the front body having a simple structure capable of absorbing shocks (loads) input to the front of the vehicle and also having a high degree of design freedom.

According to a first aspect, a front body of a vehicle includes left and right front side frames extending continuously to a cabin of the vehicle; and a subframe disposed in front of a floor of the cabin, extending to the left and right, and attached to the front side frames. An engine contact part facing toward an engine inside the front body is disposed on an upper part the subframe.

It is thus possible to simplify the structure for absorbing shocks (loads) input to the front of the vehicle and increase the degree of design freedom. Specifically, if the engine is retracted by a shock (load) input to the front of the vehicle, the shock (load) can be initially transmitted from the engine to the subframe only by the engine contact part on the upper part of the subframe and hence, the structure is simplified.

According to a second aspect, the subframe may include rear fastening parts fastened to the respective front side frames, rear arm connecting parts having respective arm engagement openings in which respective lower arms of suspensions are engaged near the respective rear fastening parts, and hollow parts extending from an engine-contact-load input part holding the engine contact part thereon to at least the respective arm engagement openings.

If a shock (load) is input to the front of the vehicle, the load is transmitted not only from the engine contact part to the rear fastening parts of the subframe, but also from the lower arms to the rear arm connecting parts. This allows the lower arms to deform the respective arm engagement openings and bend and deform the respective vicinities of the rear fastening parts into a V shape. Thus, the shock (load) input to the front of the vehicle can be absorbed.

According to a third aspect, the front side frames may include respective frame fastening parts to which the respective rear fastening parts are fastened, the frame fastening parts being connected to respective branched parts extending to the left and right of the vehicle.

Thus, a shock (load) input to the front of the vehicle is transmitted from the rear fastening parts of the subframe to the branched parts of the front side frames, so that the shock (load) can be further distributed by the branched parts. That is, if the rear fastening parts of the subframe are supported by the respective branched parts of high strength, the subframe can be reliably bent into a V shape and deformed, at a portion between each rear arm connecting part and the corresponding rear fastening part. It is thus possible to increase the amount of shock absorption.

According to a fourth aspect, the subframe may include a transverse member extending to the left and right in plan view of the vehicle, and a front branch member and a rear branch member extending from each of the left and right ends of the transverse member, the front branch member and the rear branch member extending to the front and rear, respectively, of the vehicle to form a Y shape; each of the rear arm connecting parts may be formed in the corresponding rear branch member; and each of the rear fastening parts may be formed in a branch part protruding from the corresponding rear branch member toward the rear of the vehicle.

From the engine retracted by a shock (load) input to the front of the vehicle, the load is transmitted through the engine contact part to each of the rear fastening parts. At the same time, the load is transmitted by retraction of each of the lower arms. Thus, the loads are concentrated on the shock absorbing portion between each rear branch member and the corresponding rear fastening part and deform the subframe. As a result, the shock (load) input to the front of the vehicle can be absorbed by a small deformation of the front body of the vehicle.

According to a fifth aspect, the engine contact part may be hollow, may have a contact wall facing toward the engine, and may form a triangular shape together with the upper part of the subframe as viewed from a side of the vehicle.

If the engine is retracted by a shock (load) input to the front of the vehicle and the load is transmitted from the engine to the contact wall, the load can be distributed to an inclined back bracket extending continuously from the contact wall. It is thus possible to improve strength without sacrificing weight reduction.

BRIEF DESCRIPTION OF THE DRAWINGS

The advantages of the invention will become apparent in the following description taken in conjunction with the drawings, wherein:

FIG. 11A illustrates a state in the middle of input of a shock, and FIG. 11B illustrates a state after input of a shock;

FIG. 12A illustrates a state before input of a shock, and FIG. 12B illustrates a state after input of a shock.

DETAILED DESCRIPTION OF THE INVENTION

Embodiments of the present invention will now be described in detail.

Figure 1:
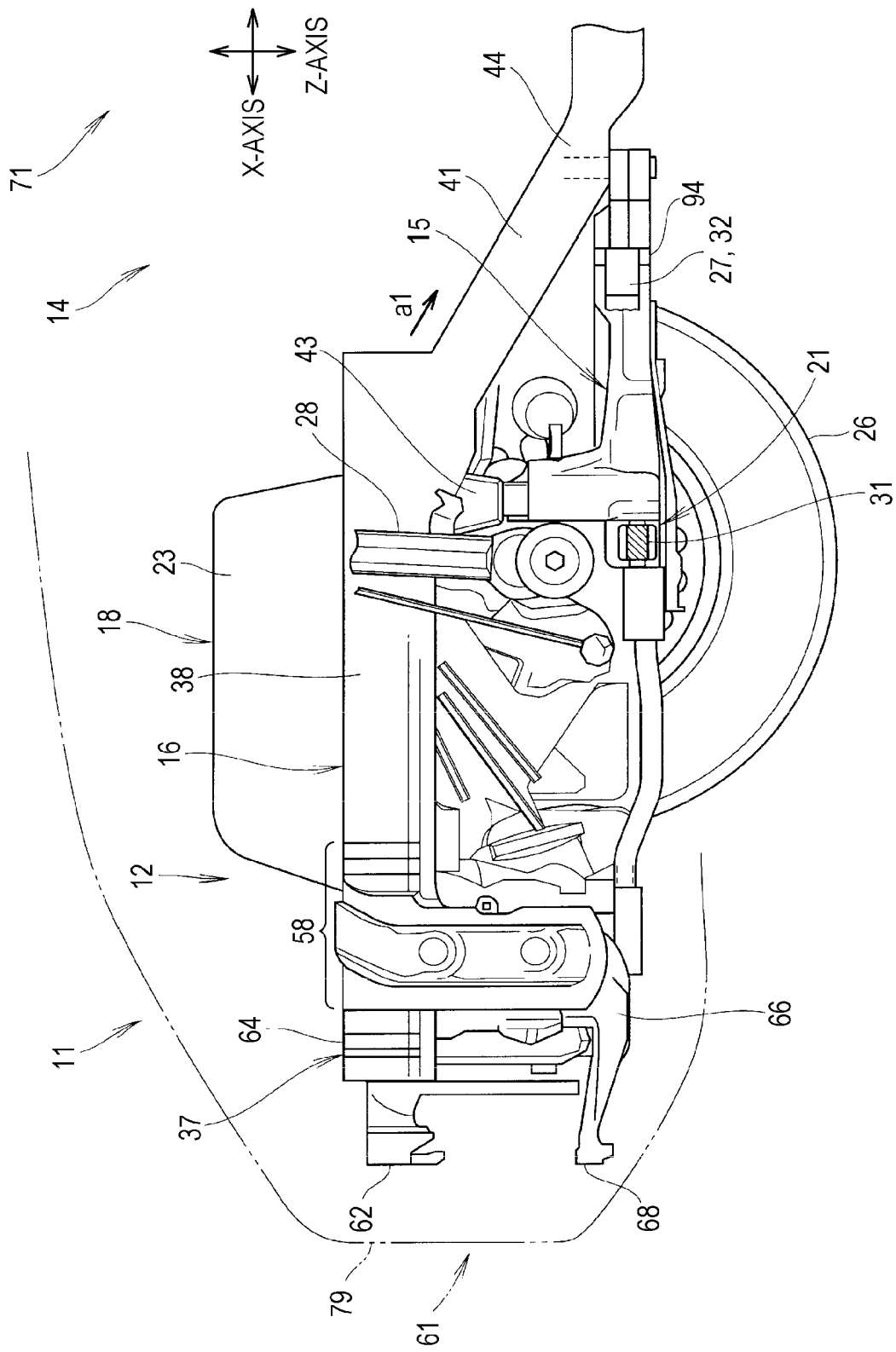
FIG. 1 is a cross-sectional view illustrating an overall configuration of a vehicle.
Figure 2:
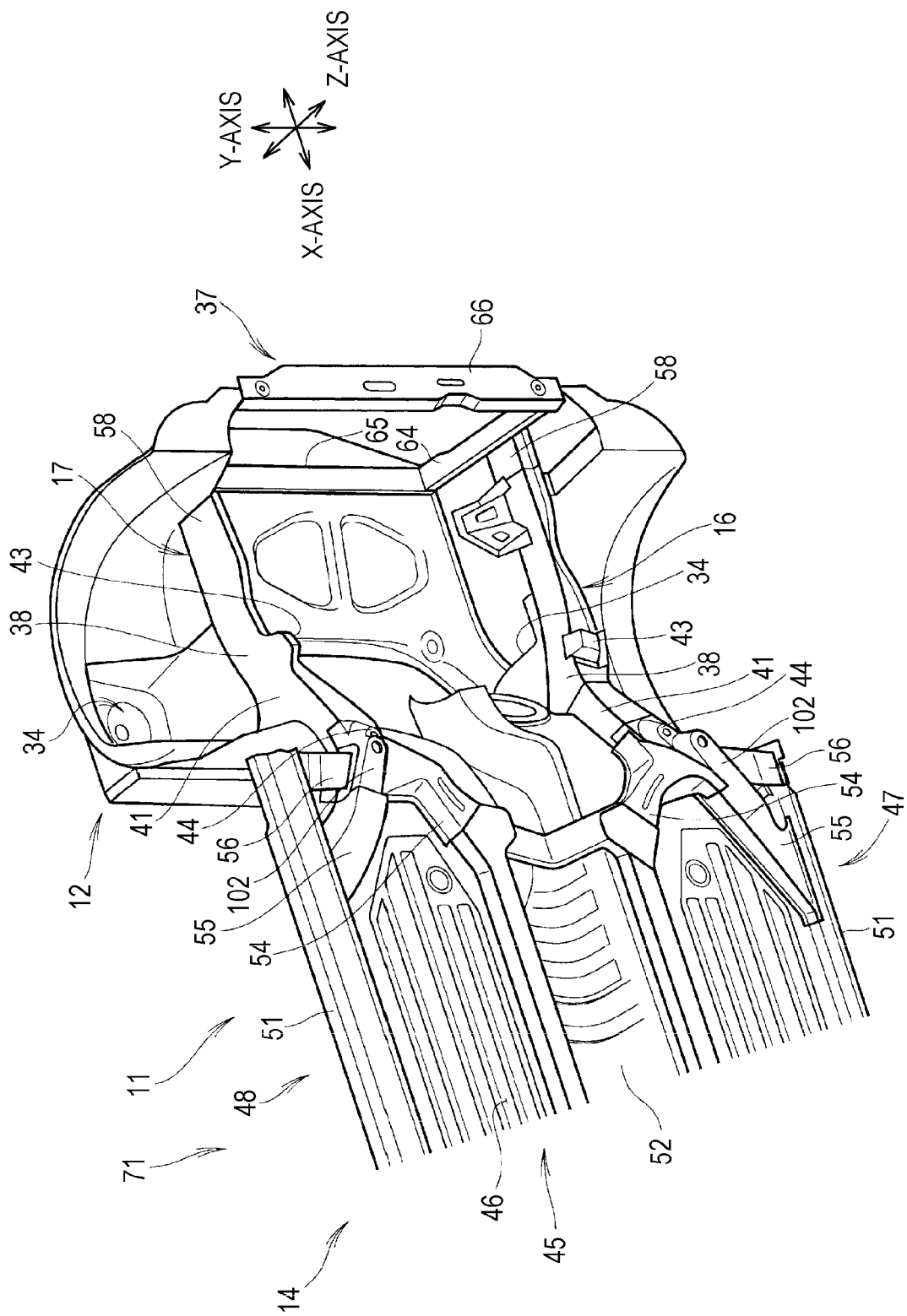
FIG. 2 is a perspective view of a front body as viewed from the bottom right of the vehicle.
Figure 3:
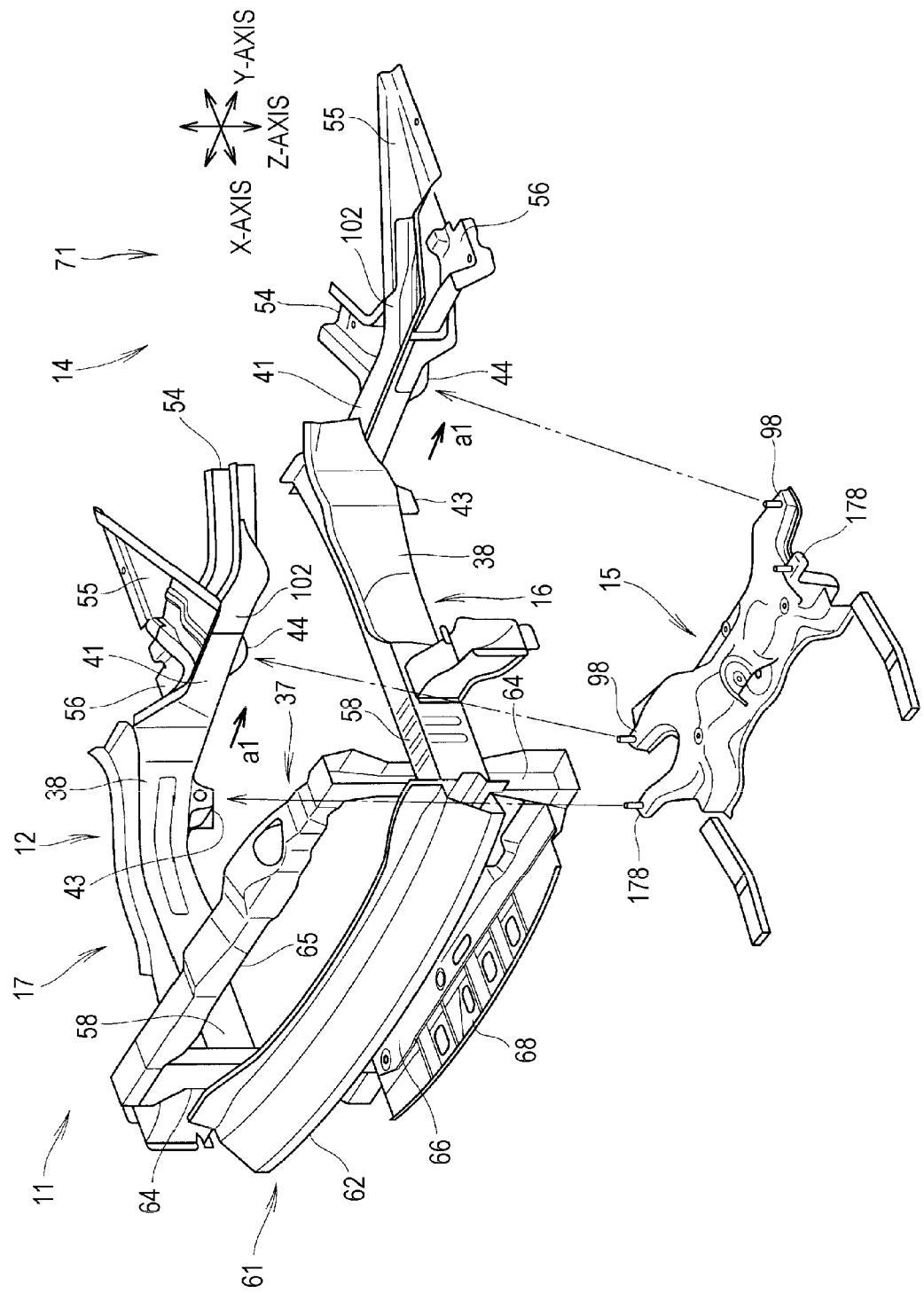
FIG. 3 is an exploded perspective view of the front body.

As illustrated in FIG. 1 to FIG. 3, a vehicle 11 has a front body 12 according to an embodiment. The front body 12 is a front part of a vehicle body 14 and includes a subframe 15. The subframe 15 and left and right front side frames 16 and 17 are configured to hold an engine 18 thereon and support front suspensions 21.

The front-rear direction of the vehicle 11 is defined as an X-axis direction, the left-right direction (vehicle width direction) of the vehicle 11 is defined as a Y-axis direction, and the up-down direction of the vehicle 11 is defined as a Z-axis direction. Note that the left-right direction is defined with respect to a driver of the vehicle 11, and that the right side of the driver sitting in the driver's seat and facing the front is referred to as "right".

Figure 5:
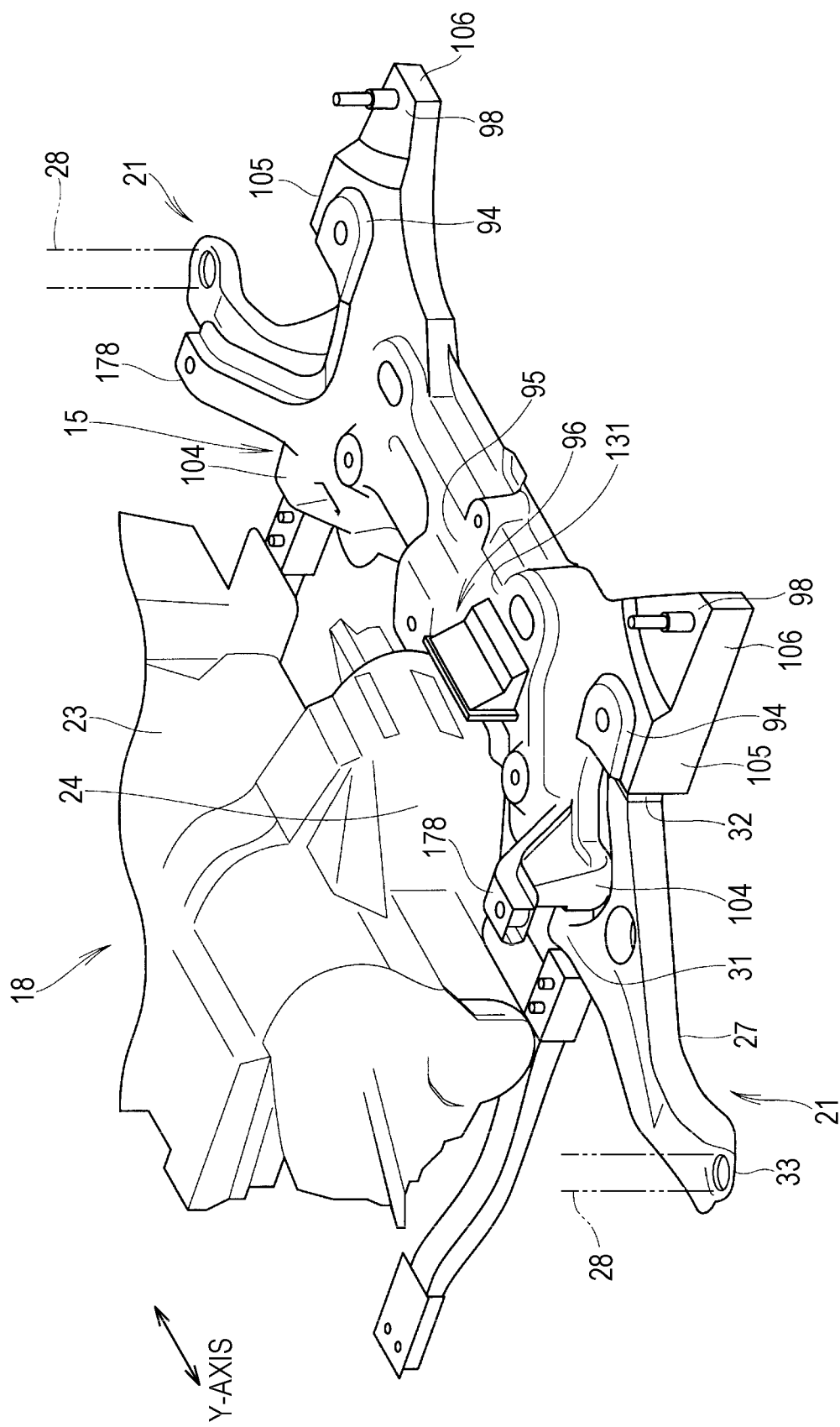
FIG. 5 is a perspective view of a subframe according to the embodiment.
Figure 6:
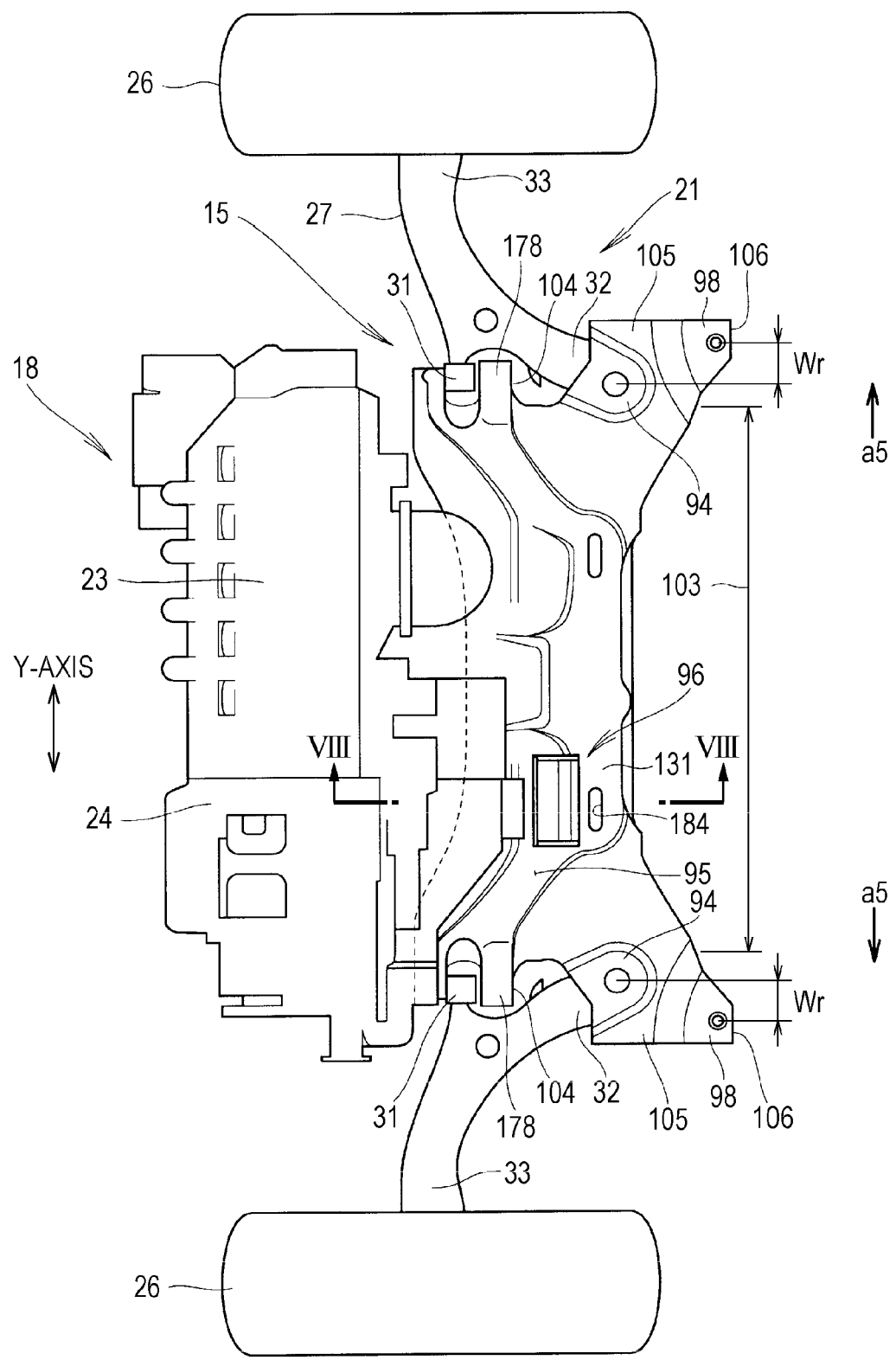
FIG. 6 is a plan view of the subframe.

As illustrated in FIG. 1, FIG. 5, and FIG. 6, the engine 18 is, for example, a transverse engine (along the Y-axis direction) which has an engine body 23 on the right and a transmission 24 on the left. The transmission 24 is connected to the engine body 23.

As illustrated in FIG. 1, FIG. 5, and FIG. 6, the front suspensions 21 are MacPherson strut suspensions having respective lower arms 27 and dampers (struts) 28. The lower arms 27 are configured to support respective front wheels 26. The dampers 28 are vertically mounted at lower ends thereof on the respective lower arms 27.

The lower arms 27 are solid casts of iron (steel) or aluminum alloy. The lower arms 27 are higher in strength than the subframe 15 made of steel plates. The lower arms 27 each have a front connecting end 31 and a rear connecting end 32 connected to the subframe 15, and an end link 33 connected to the lower end of the corresponding damper 28 that supports the front wheel 26. The upper ends of the dampers 28 are fastened to respective damper housings 34 (see FIG. 2) of the front body 12.

The front body 12 includes the left and right front side frames 16 and 17, a front frame part (bulkhead) 37 attached to the front ends of the front side frames 16 and 17, and the damper housings 34 standing on the respective front side frames 16 and 17.

As illustrated in FIG. 1 to FIG. 4, the front side frames 16 and 17 each have a substantially horizontal frame body 38 and a front floor frame 41 that obliquely extends downward from the frame body 38 toward the rear (in the direction of arrow a1). The subframe 15 is fastened from below to a front frame fastening part 43 and a rear frame fastening part 44 at the front and rear, respectively, of each front floor frame 41. Thus, the front floor frames 41 and the subframe 15 are integrally joined to an underbody (floor) 45.

Figure 4:
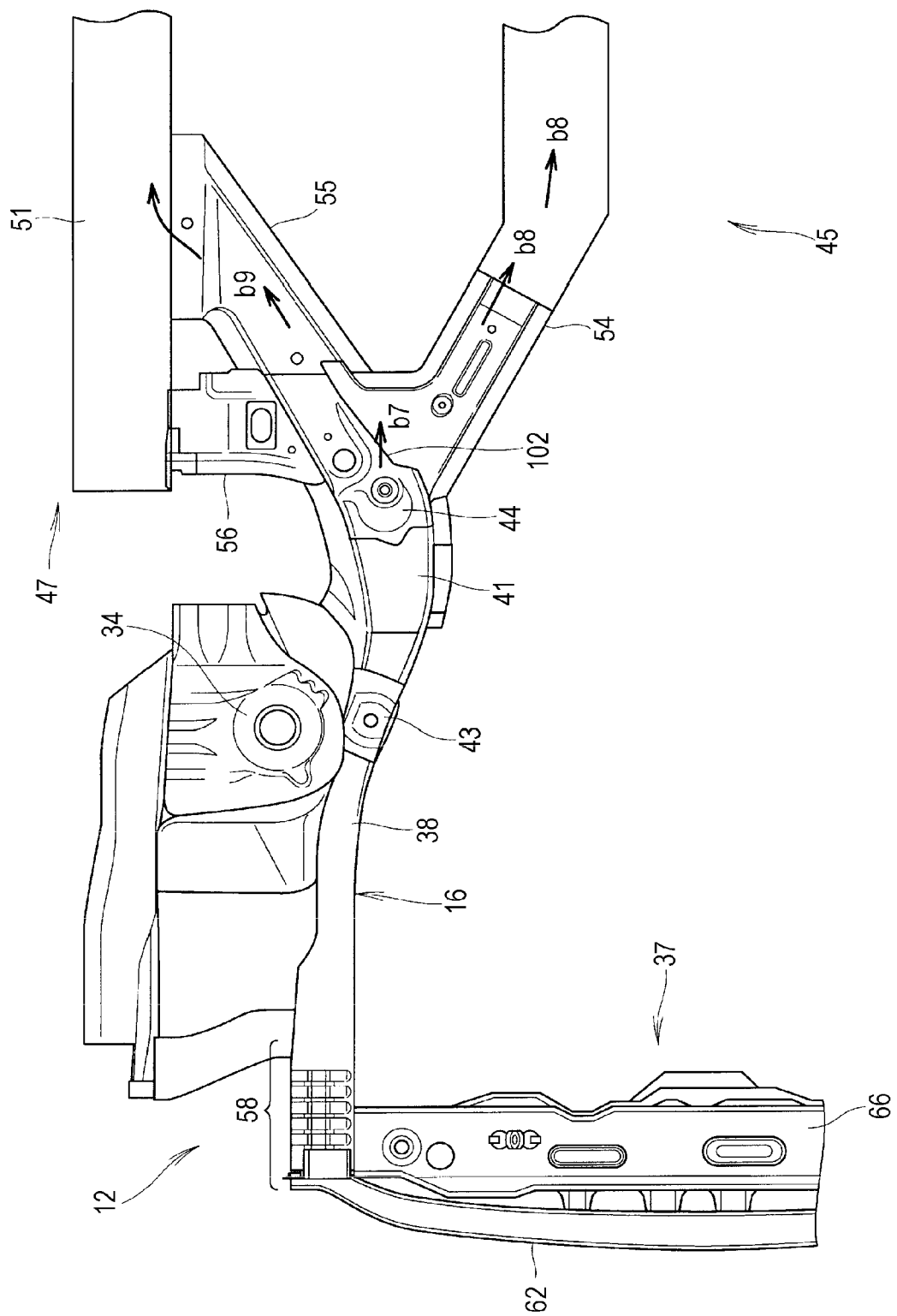
FIG. 4 is a bottom view of a left part of the front body.

As illustrated in FIG. 2, the left and right ends of a front floor panel 46 of the underbody 45 are joined to respective side sills 51 of left and right side bodies 47 and 48. The underbody 45 includes the front floor panel 46; a tunnel 52 in the center of the front floor panel 46 in the left-right direction; and a floor center frame 54, a floor frame 55, and an outrigger 56 that extend from each of the front floor frames 41 as illustrated in FIG. 2 to FIG. 4. The rear ends of the floor frames 55 and the outer ends of the outriggers 56 are joined to the side sills 51 in the rear of the left and right front side frames 16 and 17.

The front side frames 16 and 17 each have a front shock absorber 58 at the front of the frame body 38. A bumper beam 62 of a bumper 61 is attached to the front shock absorbers 58, which directly absorb a shock (load) input to the bumper beam 62.

The bumper beam 62 is directly fastened to the front ends of the front shock absorbers 58. In other words, between the bumper beam 62 and the front side frames 16 and 17, there is nothing which absorbs a shock (load) input to the bumper beam 62.

The front frame part 37 is attached to the inner sides of the front shock absorbers 58. The front frame part 37 includes front side bulkheads 64 standing on the left and right front side frames 16 and 17, a bulkhead upper frame 65 joined to upper parts of the front side bulkheads 64, and a front bulkhead lower cross-member 66 joined to lower parts of the front side bulkheads 64. A sweeper plate 68 is joined to the front bulkhead lower cross-member 66.

A main configuration of the front body 12 will now be described with reference to FIG. 1 to FIG. 10.

The front body 12 is formed by attaching the subframe 15 to the left and right front side frames 16 and 17 that extend continuously to a cabin 71 of the vehicle 11. The subframe 15 is disposed in front of the underbody 45 of the cabin 71 and extends to the left and right.

An engine contact part 96 is disposed on an upper part 95 of the subframe 15. The engine contact part 96 faces toward the engine 18 disposed inside the front body 12.

The subframe 15 includes rear fastening parts 98 fastened to the respective front side frames 16 and 17, rear arm connecting parts 94 having respective arm engagement openings 127 (see FIG. 7A and FIG. 7B) in which the respective lower arms 27 of the front suspensions 21 are engaged near the rear fastening parts 98, and a hollow part 128 (see FIG. 7A and FIG. 8) extending from an engine-contact-load input part 131 holding the engine contact part 96 thereon to at least each of the arm engagement openings 127.

The rear frame fastening parts 44 of the front side frames 16 and 17 to which the respective rear fastening parts 98 are fastened are connected to respective branched parts 102 that extend to the left and right of the vehicle 11.

As illustrated in the plan view of FIG. 6, the subframe 15 includes a transverse member 103 extending to the left and right of the vehicle 11 (in the Y-axis direction), front branch members 104, and rear branch members 105. From each of the left and right ends of the transverse member 103, each of the front branch members 104 and the corresponding rear branch member 105 extend to the front and rear, respectively, of the vehicle 11 to form a Y shape.

The rear arm connecting parts 94 are formed in the respective rear branch members 105. The rear fastening parts 98 are formed in respective branch parts 106 protruding from the respective rear branch members 105 toward the rear of the vehicle 11.

Figure 8:
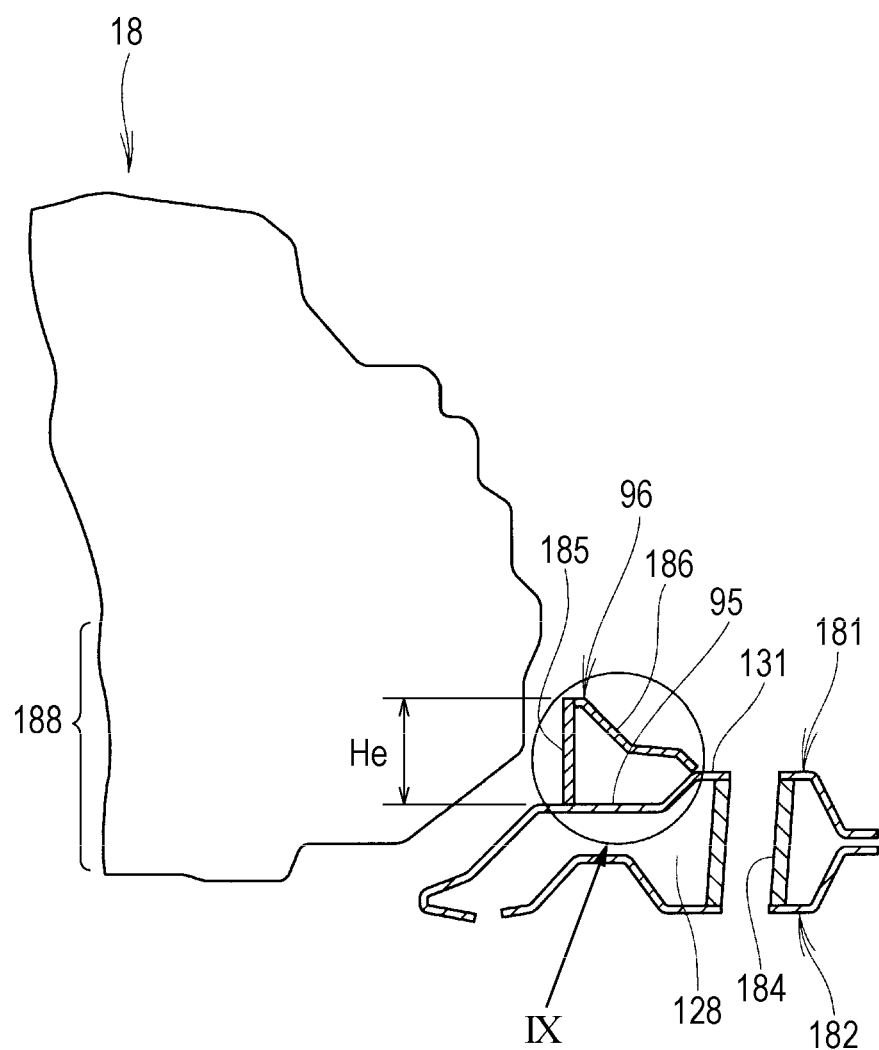
FIG. 8 is a cross-sectional view taken along line VIII-VIII of FIG. 6.
Figure 9:
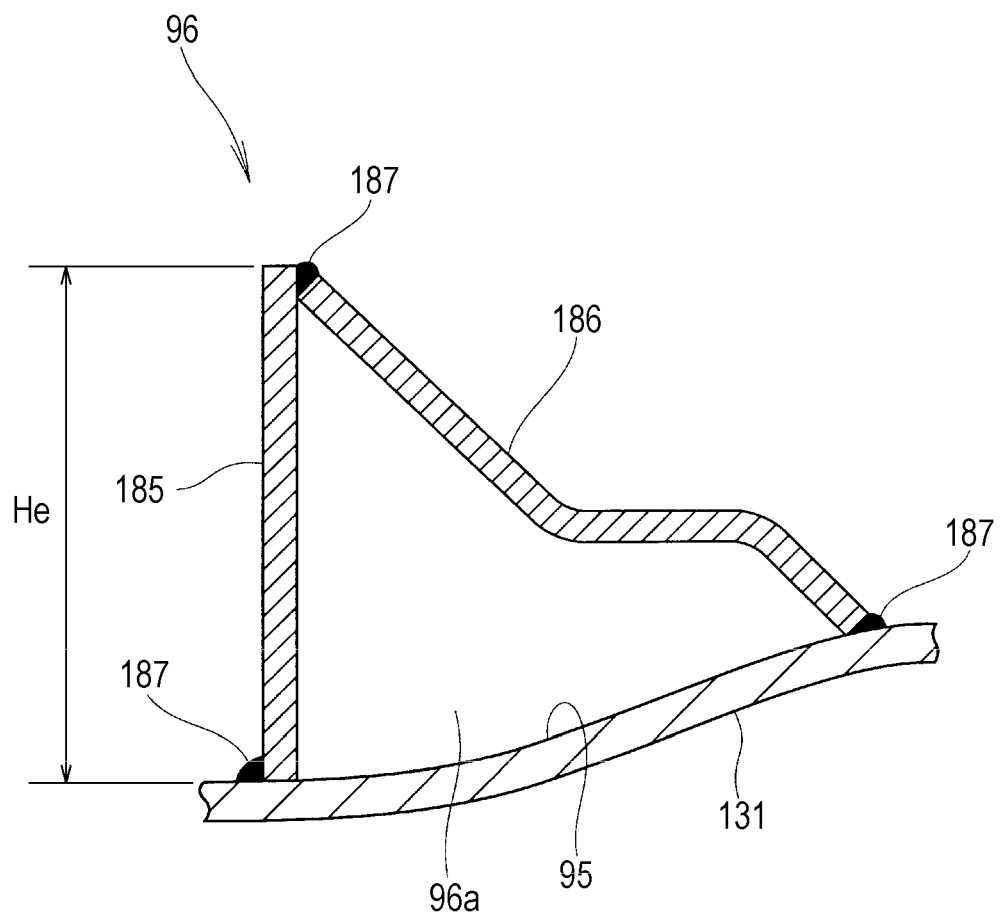
FIG. 9 is a detailed view of part IX of FIG. 8.

As illustrated in FIG. 8 and FIG. 9, the engine contact part 96 and the upper part 95 of the subframe 15 form a triangular shape, as viewed from a side of the vehicle 11. The engine contact part 96 is hollow (see hollow part 96a in FIG. 9).

The front body 12 will now be described in detail. The front body 12 includes the subframe 15 and the engine contact part 96 described above.

The subframe 15 has front fastening parts 178 (see FIG. 6) at the left and right ends of the transverse member 103. As illustrated in FIG. 3, the front fastening parts 178 are fastened to the respective front frame fastening parts 43 of the front side frames 16 and 17. At the same time, the rear fastening parts 98 of the subframe 15 are fastened to the respective rear frame fastening parts 44 of the front side frames 16 and 17.

In plan view of the vehicle 11 (as viewed as in FIG. 6), the rear fastening parts 98 are located outside the respective rear arm connecting parts 94 (in the directions of arrows a5) within the vehicle 11. In other words, the rear fastening parts 98 are spaced from the respective rear arm connecting parts 94 by distance Wr toward the outside of the vehicle 11.

Figure 7A:
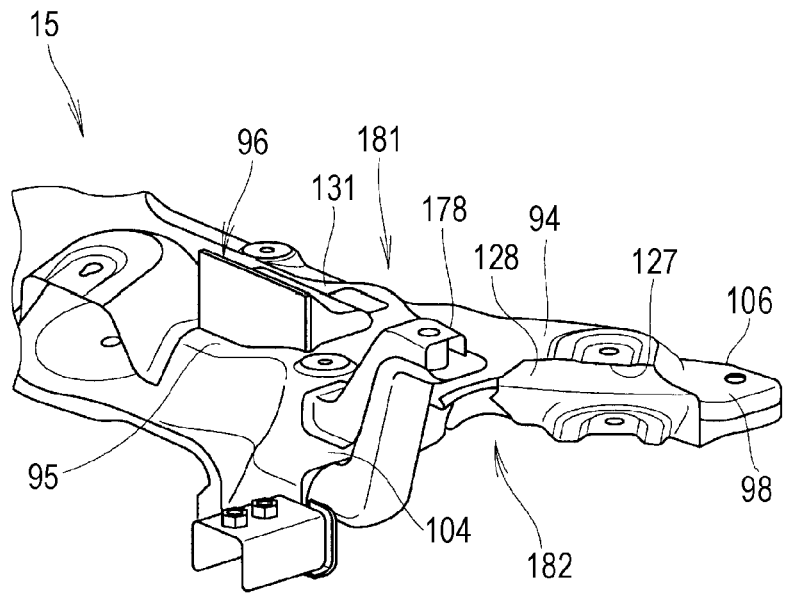
FIG. 7A and FIG. 7B are a detailed view and an exploded view, respectively, of a left part of the subframe.
Figure 7B:
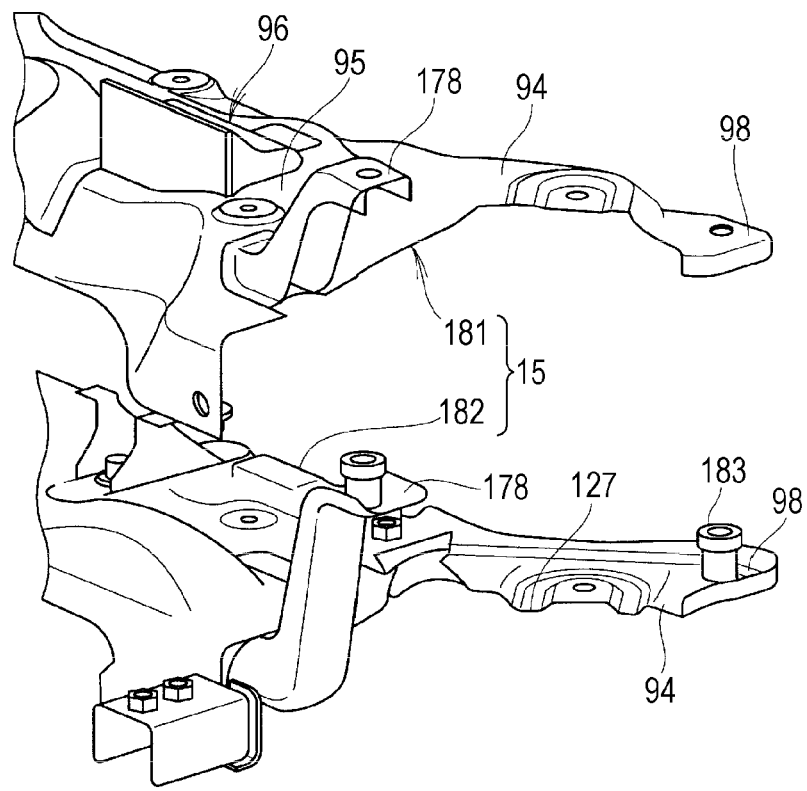

As illustrated in FIG. 7A, FIG. 7B, and FIG. 8, the subframe 15 is a hollow frame made of steel plates and formed by joining a lower body portion 182 to an upper body portion 181. Each rear fastening part 98 is provided with a collar 183 joined to the upper body portion 181 and the lower body portion 182. The subframe 15 is provided with holes 184 as illustrated in FIG. 6 and FIG. 8.

Figure 10:
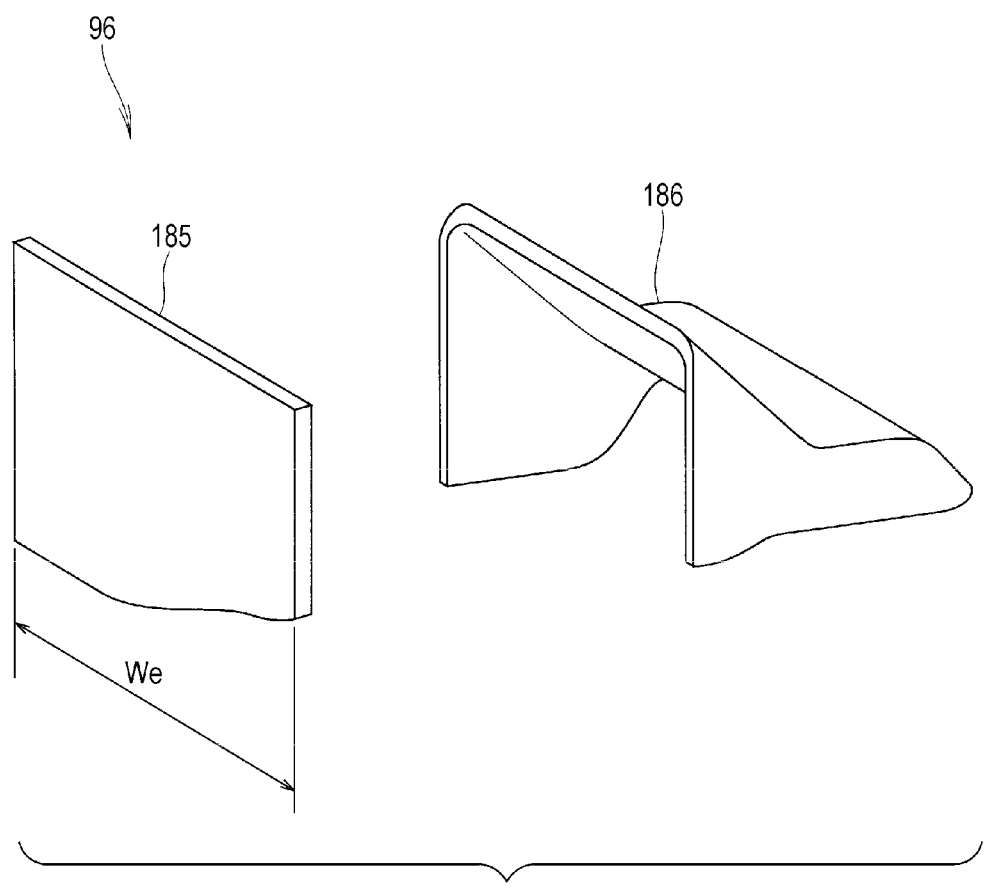
FIG. 10 is an exploded view of an engine contact part.

The engine contact part 96 is mounted at a position where the retracted engine 18 is brought into contact therewith almost simultaneously with the contact of the engine 18 with the subframe 15. As illustrated in FIG. 8 to FIG. 10, the engine contact part 96 is formed by vertically providing a contact wall 185 on the upper body portion 181 and joining a back bracket 186 to the backside of the contact wall 185. Welded portions 187 are for securing the contact wall 185 and the back bracket 186. Note that the "backside of the contact wall 185" is a backside opposite the front side with which the retracted engine 18 is brought into contact.

Height He of the engine contact part 96 is set such that the engine contact part 96 is brought into contact with a lower part 188 of the engine 18. Width We of the engine contact part 96 (in the Y-axis direction) is set to about one-seventh of the width of the subframe 15 (in the Y-axis direction). Thus, without sacrificing weight reduction, it is possible to transmit shocks (loads) to the front side frames 16 and 17 while suppressing the retraction of the engine 18.

An operation of the front body 12 according to the embodiment will now be described. A shock absorbing mechanism of the front body 12 will be discussed here (see FIG. 11A to FIG. 12B).

If an obstacle, such as an automobile, comes into contact with a front 79 of the vehicle 11, the vicinity (shock absorbing portion 98a) of each rear fastening part 98 is bent into a V shape. Thus, a shock resulting from the contact can be absorbed.

Figure 11B:
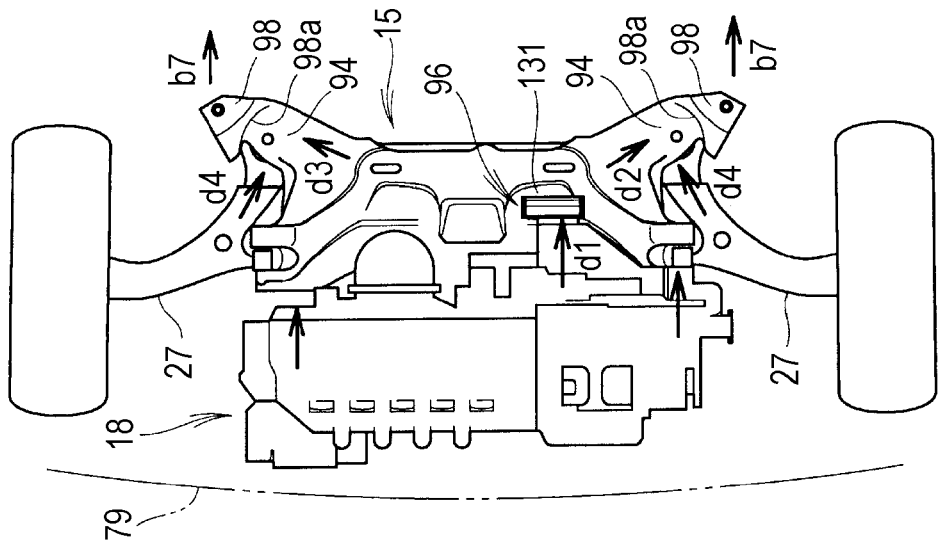
FIG. 11A and FIG. 11B are plan views illustrating a shock absorbing mechanism of the front body according to the embodiment.
Figure 11A:
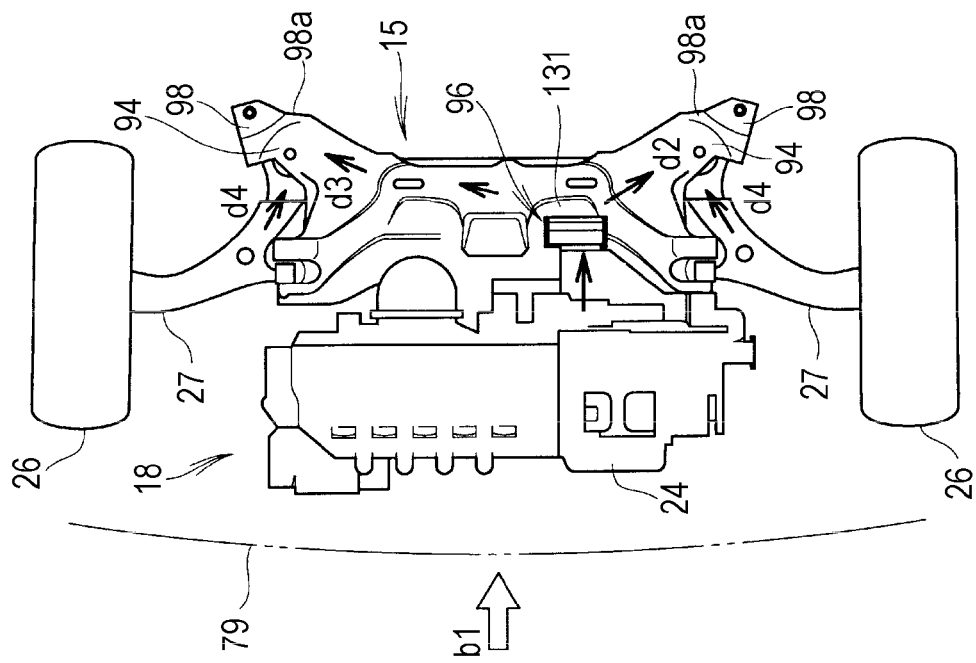

Specifically, if an obstacle comes into contact with the front 79 of the vehicle 11, the shock (load) is input to the front 79 as indicated by arrow b1 (see FIG. 11A). Then, the engine 18 is retracted to come into contact with the engine contact part 96 as indicated by arrow d1.

When the shock (load) is input to the engine contact part 96, the load is transmitted from the engine contact part 96 to the rear fastening parts 98 as indicated by arrow d2 (on the left) and arrow d3 (on the right).

Figure 12B:
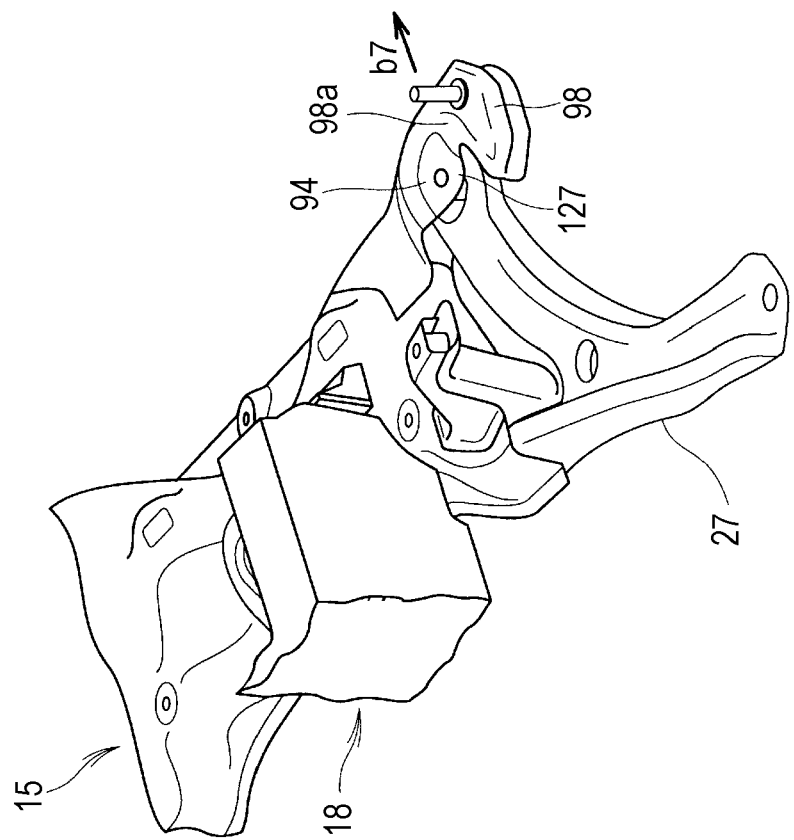
FIG. 12A and FIG. 12B are perspective views illustrating the shock absorbing mechanism of the front body according to the embodiment.
Figure 12A:
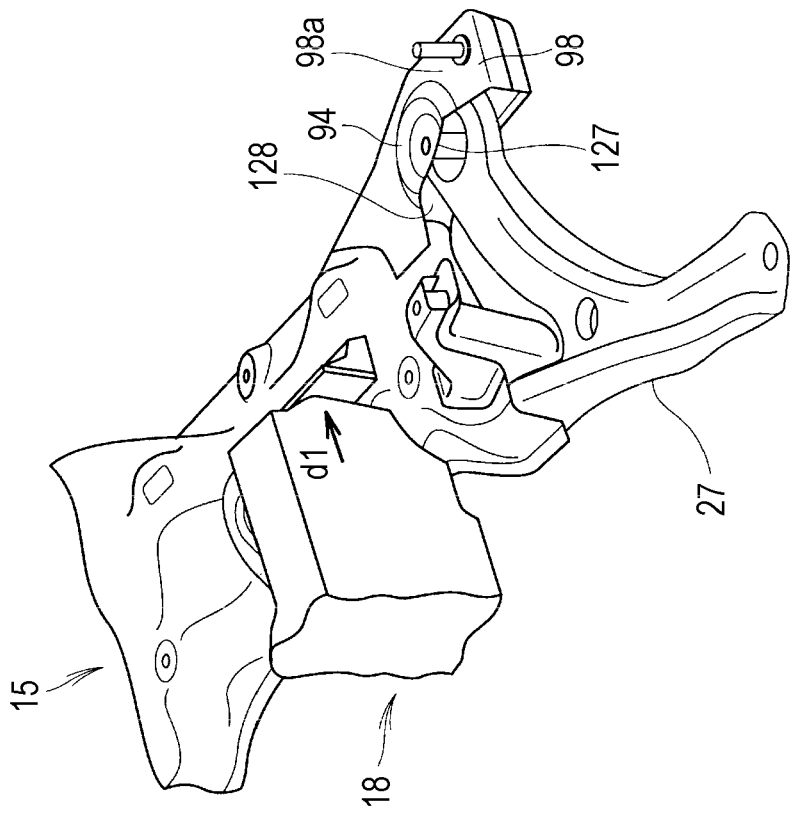

At the same time, the load is transmitted from each of the lower arms 27 to the corresponding rear arm connecting part 94 as indicated by arrow d4. Thus, since the loads are concentrated on each of the rear fastening parts 98 (shock absorbing portions 98a), the lower arm 27 deforms the corresponding arm engagement opening 127 as illustrated in FIG. 12B. Additionally, as illustrated in FIG. 11B, the subframe 15 is bent into a V shape at a portion (shock absorbing portion 98a) between each of the rear arm connecting parts 94 and the corresponding rear fastening part 98. Thus, the shock (load) input to the front 79 of the vehicle 11 can be absorbed.

In the front body 12, the shock (load) input to the front 79 of the vehicle 11 is transmitted through the rear fastening parts 98 of the subframe 15 to the branched parts 102 (see FIG. 4) of the front side frames 16 and 17 as indicated by arrow b7.

Then, as illustrated in FIG. 4, each branched part 102 can distribute the shock (load) to the floor center frame 54 and the floor frame 55 as indicated by arrow b8 and arrow b9, respectively. That is, if the rear fastening parts 98 of the subframe 15 are supported by the respective branched parts 102 of high strength, the subframe 15 can be reliably bent into a V shape and deformed, at the shock absorbing portion 98a between each rear arm connecting part 94 and the corresponding rear fastening part 98. It is thus possible to increase the amount of shock absorption.

From the engine 18 retracted by a shock (load), the load is transmitted through the engine contact part 96 to each of the rear fastening parts 98. At the same time, the load is transmitted by retraction of each of the lower arms 27. Thus, the loads are concentrated on the shock absorbing portion 98a between each rear branch member 105 and the corresponding rear fastening part 98 and deform the subframe 15. As a result, the shock (load) input to the front 79 of the vehicle 11 can be absorbed by a small deformation of the front body 12 of the vehicle 11.

The front body of the vehicle according to the present invention is suitable for use in automobiles.

Although a specific form of embodiment of the instant invention has been described above and illustrated in the accompanying drawings in order to be more clearly understood, the above description is made by way of example and not as a limitation to the scope of the instant invention. It is contemplated that various modifications apparent to one of ordinary skill in the art could be made without departing from the scope of the invention which is to be determined by the following claims.

What is claimed is:

1. A front body of a vehicle, comprising:
   left and right front side frames extending continuously from the front body of the vehicle to a cabin of the vehicle; and
   a subframe disposed in front of a floor of the cabin, extending to the left and right, and attached to the left and right front side frames,
   wherein the subframe includes:
      an engine contact part disposed on an upper part of the subframe to project upward from an upper surface of the subframe and facing toward an engine inside the front body, rear fastening parts fastened to the respective front side frames, rear arm connecting parts having respective arm engagement openings in which respective lower arms of suspensions are engaged, hollow parts continuously extending from an engine-contact-load input part holding the engine contact part thereon to at least the respective arm engagement openings, a transverse member extending to the left and right in plan view of the vehicle, a front branch member and a rear branch member extending from each of the left and right ends of the transverse member, the front branch member and the rear branch member extending to the front and rear, respectively, of the vehicle to form a Y shape, wherein each of the rear arm connecting parts is formed in the corresponding rear branch member, wherein each of the rear fastening parts is formed in a branch part protruding from the corresponding rear branch member obliquely toward the rear of the vehicle such that each of the rear fastening parts is disposed on an outer side of the corresponding rear arm connecting part in the vehicle width direction, and wherein the hollow parts further continuously extend to the respective branch parts through the respective arm engagement openings such that the hollow parts include the respective branch parts.

2. The front body according to claim 1, wherein the front side frames include respective frame fastening parts to which the respective rear fastening parts are fastened, the frame fastening parts being connected to respective branched parts extending to the left and right of the vehicle.

3. The front body according to claim 1, wherein the engine contact part is hollow, has a contact wall facing toward the engine, and forms a triangular shape together with the upper part of the subframe as viewed from a side of the vehicle.

4. The front body according to claim 1, wherein the engine contact part is disposed on an inner side of the rear arm connecting part in the vehicle width direction.

* * * * *